(12) United States Patent
Kamada et al.

(10) Patent No.: US 12,257,872 B2
(45) Date of Patent: Mar. 25, 2025

(54) VEHICLE

(71) Applicant: YAMAHA HATSUDOKI KABUSHIKI KAISHA, Iwata (JP)

(72) Inventors: Kensuke Kamada, Shizuoka (JP); Tatsuya Tanaka, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/622,499

(22) Filed: Mar. 29, 2024

(65) Prior Publication Data

US 2024/0326541 A1    Oct. 3, 2024

(30) Foreign Application Priority Data

Mar. 31, 2023   (JP) ................. 2023-059547

(51) Int. Cl.
*B60G 17/016*   (2006.01)
*B60G 17/06*    (2006.01)
(Continued)

(52) U.S. Cl.
CPC ......... *B60G 17/0163* (2013.01); *B60G 17/06* (2013.01); *B62K 19/48* (2013.01); *B62K 21/12* (2013.01); *B60G 2300/07* (2013.01)

(58) Field of Classification Search
CPC ...... B60G 17/016; B60G 17/02; B60G 17/06; B60G 2300/07; B62K 2025/048; B62K 21/12; F16F 9/44; F16F 9/446
See application file for complete search history.

(56) References Cited

U.S. PATENT DOCUMENTS 9,862,425 B2 *  1/2018  Suzuki ................ B62D 23/005
11,718,134 B1 *  8/2023  Ishibashi ............. B60G 11/182
                                                280/124.167
(Continued)

FOREIGN PATENT DOCUMENTS

GB        2467553 A  *  8/2010  .......... B60G 15/063
JP     2016-030516 A     3/2016

OTHER PUBLICATIONS

Masahiro Yoshida. Vehicle. Yamaha Hatsudoki Kabushiki Kaisha. U.S. Appl. No. 18/622,530, filed Mar. 29, 2024.
(Continued)

*Primary Examiner* — Paul N Dickson
*Assistant Examiner* — Matthew D Lee
(74) *Attorney, Agent, or Firm* — Rabin & Berdo, P.C.

(57) ABSTRACT

A vehicle, including: a pair of front wheels; a pair of rear wheels; a saddle-style seat, positioned at an intermediate region in a width direction of the vehicle; a steering shaft provided ahead of the seat; a bar handle connected with an upper portion of the steering shaft, the bar handle having a pair of grips; a front fender provided above the pair of front wheels, striding over the pair of front wheels in a plan view of the vehicle; and a pair of suspensions, top ends of which are located ahead of the two grips, and are positioned, in the plan view of the vehicle, more inboard than widthwise ends of the two grips in the width direction of the vehicle. Each suspension includes, at an upper portion thereof, a suspension adjusting portion. The front fender includes a pair of openings through which the suspension adjusting portions are accessible.

11 Claims, 14 Drawing Sheets

(51) Int. Cl.
*B62K 19/48* (2006.01)
*B62K 21/12* (2006.01)

(56) References Cited

U.S. PATENT DOCUMENTS

| | | | | |
|---|---|---|---|---|
| 2007/0176387 | A1* | 8/2007 | Tsuruta | B60G 11/15 |
| | | | | 280/124.135 |
| 2020/0407008 | A1* | 12/2020 | Kuwabara | F16F 9/44 |
| 2021/0008948 | A1* | 1/2021 | Kirar | B60G 15/12 |
| 2021/0086578 | A1 | 3/2021 | Brady et al. | |
| 2022/0288990 | A1* | 9/2022 | Smith | B60G 17/019 |

OTHER PUBLICATIONS

Masahiro Yoshida; Kohei Miyara. Vehicle. Yamaha Hatsudoki Kabushiki Kaisha. U.S. Appl. No. 18/622,457, filed Mar. 29, 2024.

Tatsuya Tanaka; Masahiro Yoshida. Vehicle. Yamaha Hatsudoki Kabushiki Kaisha. U.S. Appl. No. 18/622,617, filed Mar. 29, 2024.

\* cited by examiner

VEHICLE

BACKGROUND OF THE INVENTION

Field of the Invention

The present invention relates to vehicles, and more specifically to a straddled vehicle such as an ATV (All Terrain Vehicle).

Description of the Related Art

As an example of conventional techniques of this kind, U.S. Patent Application Publication No. 2021/0086578 discloses a vehicle having a suspension. In the vehicle, a damping control system for a vehicle having a suspension located between a plurality of ground engaging members such as wheels and a vehicle frame includes a shock absorber with an adjustable damping characteristic. Also, the system includes a controller connected with the shock absorber for adjusting the damping characteristic of the shock absorber, and a user interface connected with the controller and accessible to a driver of the vehicle. The user interface includes a user input which allows manual adjustment of the damping characteristic of the shock absorber while the vehicle is in operation. Also, the controller is connected with vehicle sensors for adjusting the damping characteristic of the shock absorber based on vehicle conditions determined in accordance with sensor output signals.

Also, U.S. Pat. No. 9,862,425 discloses a vehicle, which is an ROV including a plurality of seats placed side by side in the vehicle's width direction, a left shock absorber, a right shock absorber, and a front cover. The front cover is formed with left and right openings. The left shock absorber has an upper end portion and the right shock absorber has an upper end portion, each disposed visible within the respective left and right openings in a plan view of the vehicle. Also, on a leftward side of the left shock absorber, there is disposed a left damping force adjuster for adjusting the damping force of the left shock absorber, and on a rightward side of the right shock absorber, there is disposed a right damping force adjuster for adjusting the damping force of the right shock absorber. Part of the left damping force adjuster is disposed above the left opening, and part of the right damping force adjuster is disposed above the right opening.

In the vehicle disclosed in the U.S. Patent Application Publication No. 2021/0086578, the shock absorber's damping force is controlled electrically, which means that an additional electronic device such as a user interface is required.

Also, in the vehicle disclosed in the U.S. Pat. No. 9,862,425, the left and the right damping force adjusters have their respective parts located above the left and right openings of the front cover; however, the vehicle is an ROV and it is impossible for the driver to access and operate the damping force adjusters while sitting on the seat.

SUMMARY OF THE INVENTION

Therefore, a primary object of the present invention is to provide a vehicle in which it is possible to adjust a suspension easily without requiring new electronic devices such as a user interface.

According to an aspect of the present invention, there is provided a vehicle which includes a pair of front wheels; a pair of rear wheels; a saddle-style seat provided at an intermediate region in a width direction of the vehicle; a steering shaft provided ahead of the seat; a bar handle having a grip and connected with an upper portion of the steering shaft; a front fender provided above the pair of front wheels, striding over the pair of front wheels in a plan view; and a suspension having a top end located ahead of the grip, more inboard in the vehicle's width direction than a widthwise end of the grip in a plan view. The suspension includes, at an upper portion thereof, a suspension adjusting portion, and the front fender includes an opening allowing access to the suspension adjusting portion.

According to the present invention, the suspension adjusting portion is near the grip, and it is possible to make direct access to the suspension adjusting portion from the opening of the front fender. Therefore, it is possible, without requiring any new electronic devices such as a user interface, to operate the suspension adjusting portion to adjust the suspension easily.

Preferably, the top end of the suspension is located more rearward than a center of the front wheel. In this case, it is also possible to access the suspension adjusting portion from near the bar handle.

Further preferably, the front fender is provided to cross a line segment which connects a top end of the front wheel and the grip. In this case, it is easy to form the opening in the front fender which makes it possible to access the suspension adjusting portion.

Further, preferably, the top end of the suspension is exposed from the opening in a plan view. In this case, it is easy to access the suspension adjusting portion which is located at the upper portion of the suspension.

Preferably, the top end of the suspension is located at a higher position than a front end of the front fender in a front view. In this case, it is easy to access the suspension adjusting portion which is located at the upper portion of the suspension. Also, the invention makes it possible to utilize a long suspension extending upward beyond the front fender, making it possible to increase wheel travel.

Further preferably, the top end of the suspension is located above the opening. In this case, it is easy to access the suspension adjusting portion which is located at the upper portion of the suspension. Also, the invention makes it possible to utilize a long suspension extending upward beyond the front fender, making it possible to increase wheel travel.

Further, preferably, the suspension further includes a shock absorber, and the suspension adjusting portion includes a damping force adjusting portion for a damping force adjustment of the shock absorber. In this case, it is easy, with the damping force adjusting portion, to adjust the damping force of the shock absorber.

Preferably, the suspension further includes an upper arm connected with a lower end of the shock absorber. In this case, it is possible to ensure sufficient suspension stroke without any need for a structure to avoid interference with the upper arm, for example. The arrangement improves freedom in designing the shock absorber.

Further preferably, the damping force adjusting portion is located more outboard in the vehicle's width direction than a top end of the shock absorber. In this case, it is possible to smoothly access the damping force adjusting portion without being obstructed by the shock absorber.

Further, preferably, the damping force adjusting portion is located inside a circle with a radius from an upper end portion of the steering shaft to an end of the grip in a plan view. In this case, it is possible to dispose the damping force adjusting portion near the bar handle, which makes it easy to access the damping force adjusting portion.

Preferably, the suspension further includes a spring, and the suspension adjusting portion includes a load adjusting portion for a preload adjustment of the spring. In this case, it is easy, with the load adjusting portion, to adjust the preload of the spring.

Also, there is provided a vehicle which includes a pair of front wheels; a pair of rear wheels; a saddle-style seat provided at an intermediate region in a width direction of the vehicle; a steering shaft provided ahead of the seat; a bar handle having a grip and connected with an upper portion of the steering shaft; a front fender provided above the pair of front wheels, striding over the pair of front wheels in a plan view; and a suspension having a top end located ahead of the grip, more inboard in the vehicle's width direction than a widthwise end of the grip in a plan view. The suspension includes a shock absorber and an upper arm connected with a lower end of the shock absorber; the front fender includes an opening allowing access to the shock absorber; and the shock absorber has a top end located at a higher position than a front end of the front fender in a front view.

According to the present invention, it is possible to remove the shock absorber through the opening without removing the front fender.

The above-described object and other objects, characteristics, aspects and advantages of the present invention will become clearer from the following detailed description of embodiments of the present invention to be made with reference to the attached drawings.

DETAILED DESCRIPTION OF THE PREFERRED EMBODIMENTS

Figure 1:
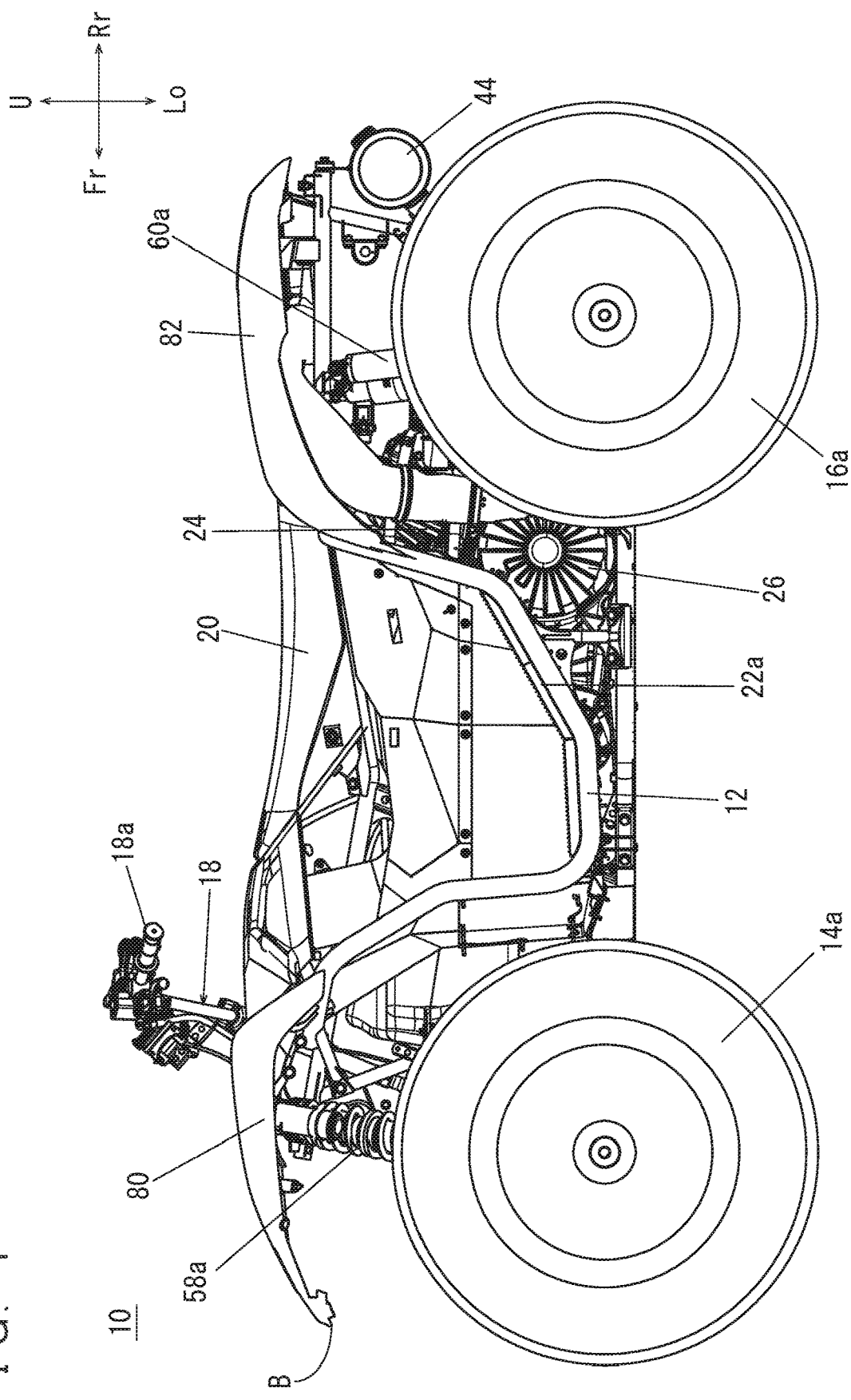
FIG. 1 is a side view which shows a vehicle according to an embodiment of the present invention.

Hereinafter, embodiments of the present invention will be described with reference to the drawings.

In the drawings, "Fr" indicates forward, "Rr" indicates rearward, "R" indicates rightward, "L" indicates leftward, "U" indicates upward and "Lo" indicates downward.

Referring to FIG. 1 through FIG. 5, a vehicle 10 according to an embodiment of the present invention is a straddled vehicle, and more specifically a four-wheeled ATV, which includes a body frame 12, a pair of front wheels 14a, 14b, a pair of rear wheels 16a, 16b, a bar handle 18, a saddle-style seat 20, and a pair of footrests 22a, 22b.

Referring also to FIG. 6 through FIG. 10, the pair of front wheels 14a, 14b are provided at a front portion of the body frame 12 via a pair of suspensions 58a, 58b (which will be described later). The pair of rear wheels 16a, 16b are provided at a rear portion of the body frame 12 via a pair of suspensions 60a, 60b (which will be described later). The bar handle 18 is provided in an intermediate region in the vehicle's width direction, connected at an upper portion of a steering shaft 54 (which will be described later), above the front wheels 14a, 14b in a side view. The bar handle 18 has grips 18a, 18b at its respective ends. The seat 20 is provided at an intermediate portion in the vehicle's width direction, at a higher position than the front wheels 14a, 14b and the rear wheels 16a, 16b, between the front wheels 14a, 14b and the rear wheels 16a, 16b in a side view, and is supported by the body frame 12. The pair of footrests 22a, 22b, serving as places where the rider puts his/her respective feet, are provided in the body frame 12, disposed between the front wheels 14a, 14b and the rear wheels 16a, 16b in a side view.

Figure 11:
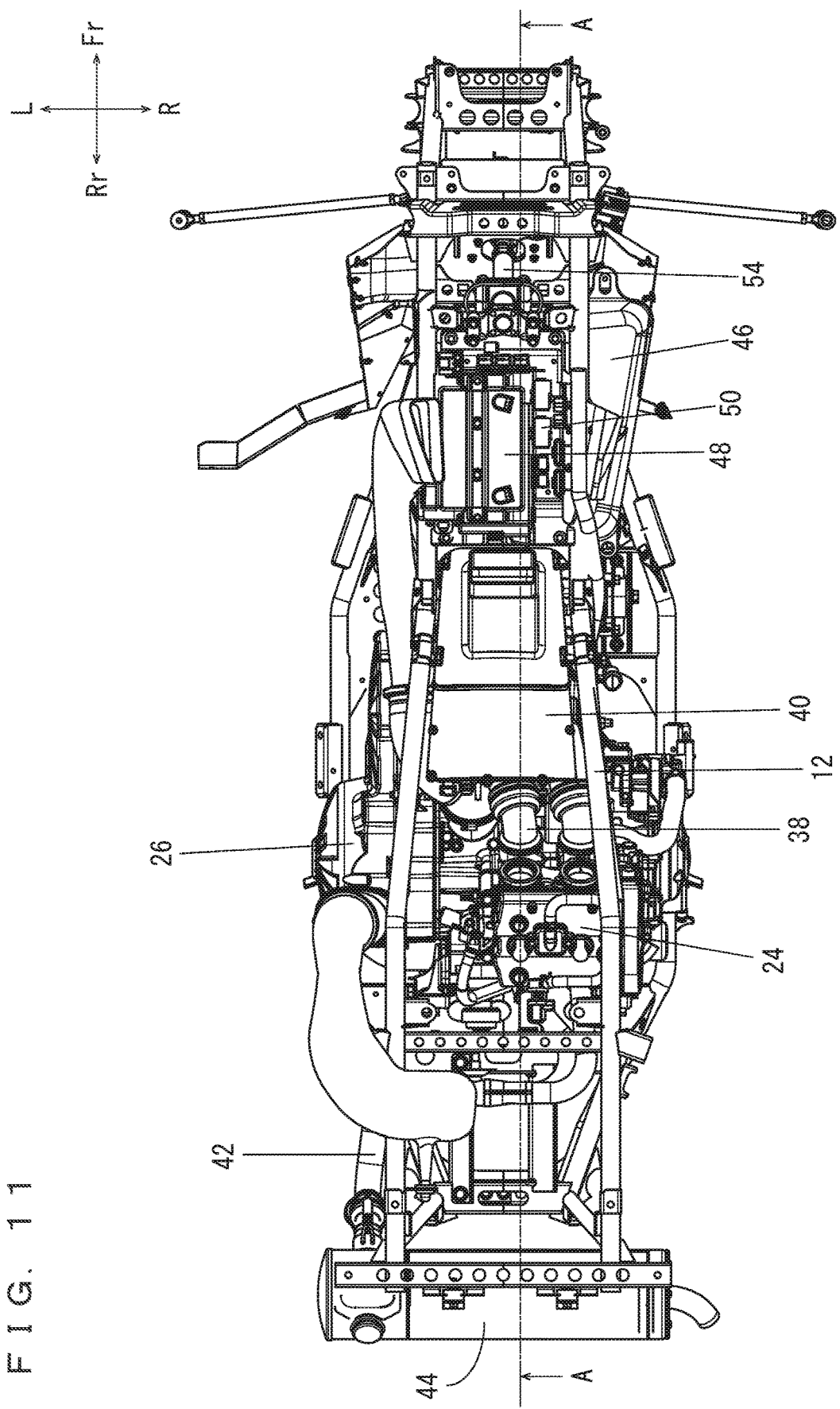
FIG. 11 is a plan view which shows an inside structure of the vehicle in FIG. 1.
Figure 12:
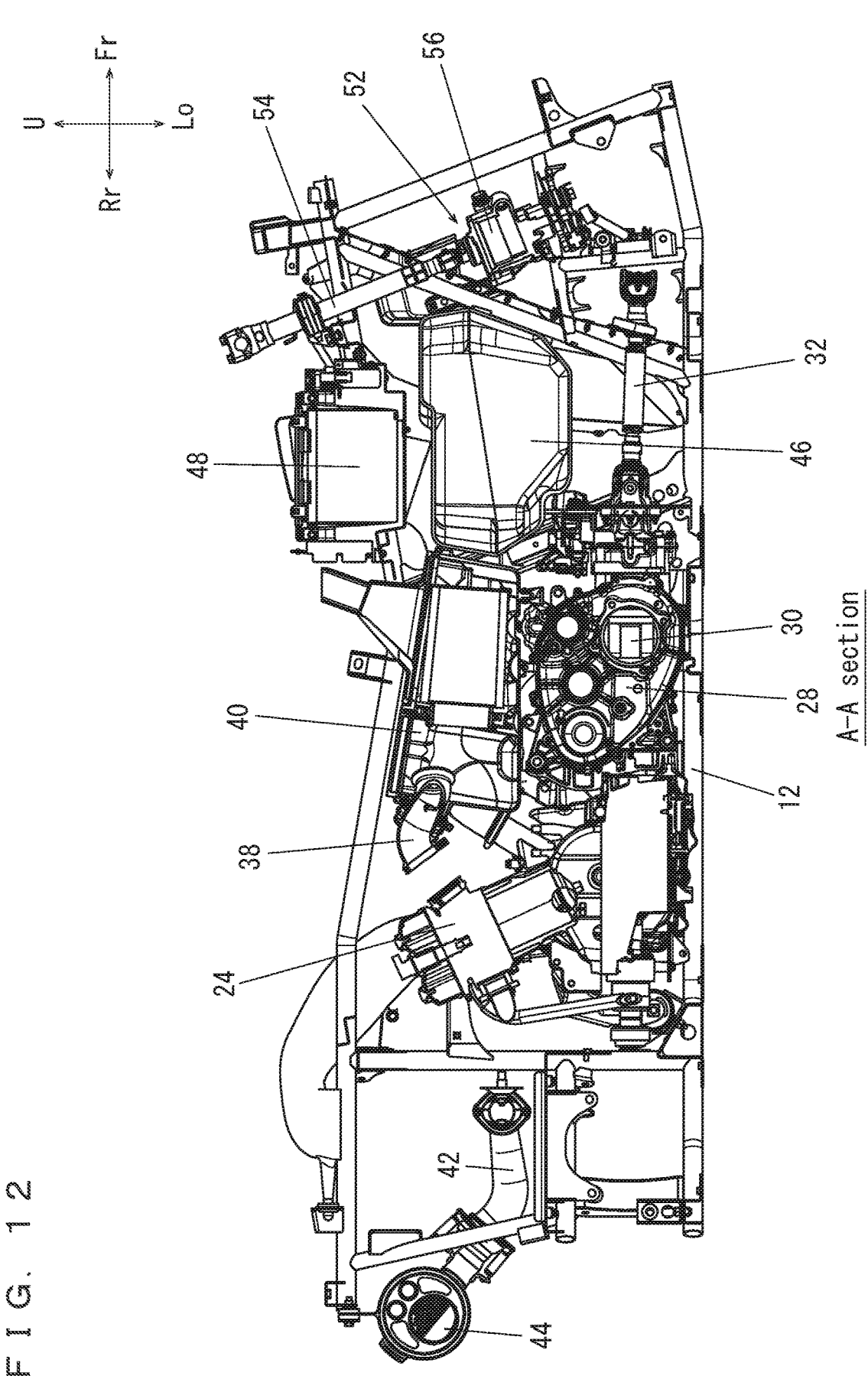
FIG. 12 is a sectional view taken in a line A-A in FIG. 11.

Referring to FIG. 11 and FIG. 12, the vehicle 10 further includes an engine 24 as a prime mover, a continuously variable transmission 26, and a transmission 28. The engine 24, the continuously variable transmission 26 and the transmission 28 are provided in the body frame 12.

In the present embodiment, the engine 24 is provided by a parallel two-cylinder engine. The engine 24 is disposed at a place slightly rearward than a center portion in a fore-aft direction of the body frame 12, with a rearward tilt. In other words, the engine 24 is laid in a rear-midship style. The continuously variable transmission 26, which receives an output from the engine 24, is provided on an outer side (left side in the present embodiment) of the engine 24. The transmission 28 is provided ahead of the engine 24 in order to speed-change an output from the continuously variable transmission 26. Therefore, the engine 24 and the transmission 28 are connected with each other via the continuously variable transmission 26.

The vehicle 10 further includes a propeller shaft 30 connected with the transmission 28 and extending in a fore-aft direction; a front shaft 32 connected with a front end portion of the propeller shaft 30 and extending in a fore-aft direction; a rotation transmission portion 34 (see FIG. 8) which transmits rotation coming from the transmission 28 via the propeller shaft 30 and the front shaft 32 to the pair of front wheels 14a, 14b; rear a shaft (not illustrated) connected with a rear end portion of the propeller shaft 30 and extending in a fore-aft direction; and a rotation transmission portion 36 which transmits rotation coming from the transmission 28 via the propeller shaft 30 and the rear shaft to the pair of rear wheels 16a, 16b.

The rotation transmission portion 34 is connected with the engine 24 via the front shaft 32, the propeller shaft 30, the transmission 28 and the continuously variable transmission 26. The rotation transmission portion 36 is connected with the engine 24 via the rear shaft, the propeller shaft 30, the transmission 28 and the continuously variable transmission 26. Therefore, rotation of the engine 24 undergoes speed changes performed by the continuously variable transmission 26 and the transmission 28, and then is transmitted to the pair of front wheels 14a, 14b via the propeller shaft 30, the front shaft 32, and the rotation transmission portion 34. This rotates the pair of front wheels 14a, 14b. Also, rotation of the engine 24 undergoes speed changes performed by the continuously variable transmission 26 and the transmission 28, and then is transmitted to the pair of rear wheels 16a, 16b via the propeller shaft 30, the rear shaft, and the rotation transmission portion 36. This rotates the pair of rear wheels 16a, 16b.

The vehicle 10 further includes an air intake pipe 38 connected with the engine 24 in order to supply air into the engine 24, an air cleaner 40 connected with the air intake pipe 38, an exhaust pipe 42 connected with the engine 24 to discharge exhaust from the engine 24, and a muffler 44 connected with the exhaust pipe 42.

The air cleaner 40 is provided ahead of the engine 24 to overlap with the engine 24 in a front view, below the seat 20. The muffler 44 is provided behind the engine 24. The air intake pipe 38 is connected with a front portion of the engine 24. The exhaust pipe 42 is connected with a rear portion of the engine 24. Therefore, the engine 24 has a structure called front intake rear exhaust.

The vehicle 10 further includes a fuel tank 46 which holds fuel to be supplied to the engine 24, and a battery 48 and an electric box 50 which are provided above the fuel tank 46.

The fuel tank 46 is provided at a position diagonally forward and upward of the transmission 28, ahead of the air cleaner 40. The battery 48 and the electric box 50 are provided side by side ahead of the seat 20.

The vehicle 10 further includes a steering mechanism 52 for steering the pair of front wheels 14a, 14b.

The steering mechanism 52 includes the steering shaft 54, and an electric power steering (EPS) 56 provided on the steering shaft 54. The steering shaft 54 is provided ahead of the seat 20. The electric power steering 56 is provided ahead of the fuel tank 46.

The vehicle 10 further includes the pair of suspensions 58a, 58b which are provided in the body frame 12 and suspend the pair of front wheels 14a, 14b; and the pair of suspensions 60a, 60b which are provided in the body frame 12 and suspend the pair of rear wheels 16a, 16b.

Figure 2:
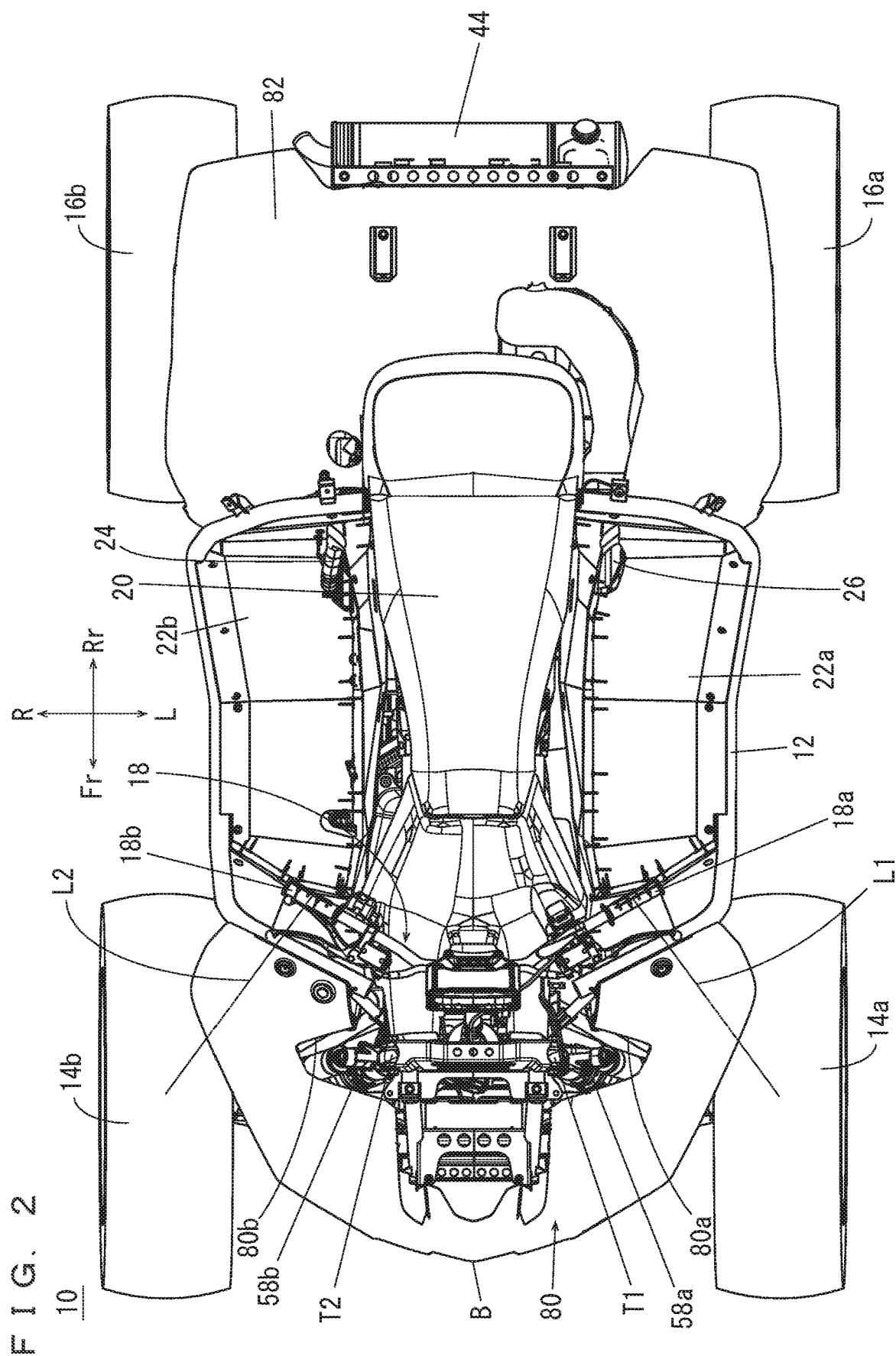
FIG. 2 is a plan view which shows the vehicle in FIG. 1.
Figure 3:
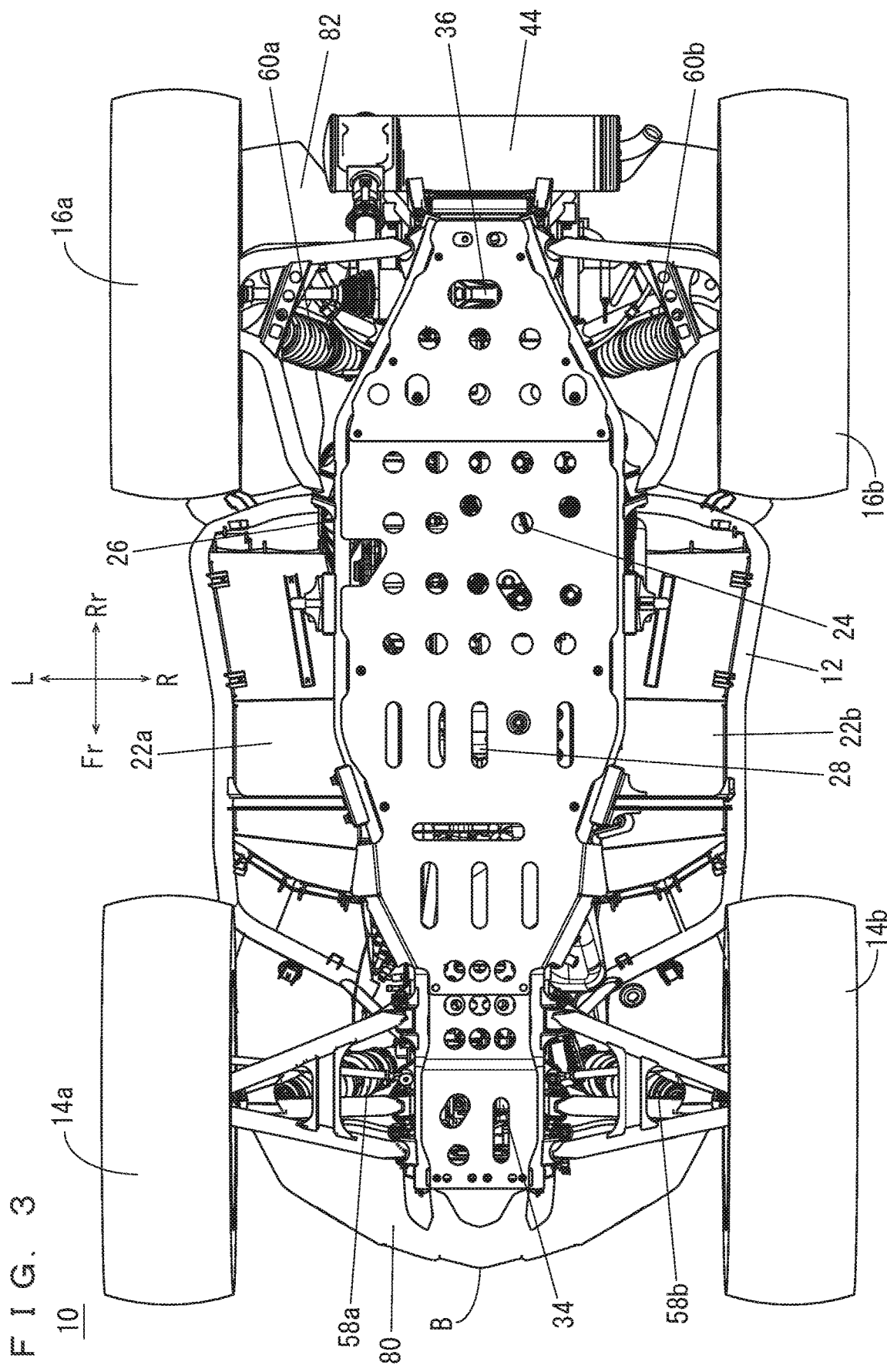
FIG. 3 is a bottom view which shows the vehicle in FIG. 1.

Referring to FIG. 2, the pair of suspensions 58a, 58b have their respective top ends T1, T2, located ahead of the grips 18a, 18b in a plan view, more inboard in the vehicle's width direction than widthwise ends of the grips 18a, 18b, more rearward than the centers of the front wheels 14a, 14b.

Referring to FIG. 6 through FIG. 9, the pair of suspensions 58a, 58b include shock absorbers 62a, 62b; springs 64a, 64b; reservoir tanks 66a, 66b; upper arms 68a, 68b; lower arms 70a, 70b; and knuckles 72a, 72b, respectively.

The springs 64a, 64b are fitted around the outer circumferences of the shock absorbers 62a, 62b respectively. The shock absorbers 62a, 62b have their respective upper end portions connected with the reservoir tanks 66a, 66b. The upper arms 68a, 68b are respectively connected pivotably with the body frame 12. The lower arms 70a, 70b are respectively placed below the upper arms 68a, 68b, and connected pivotably with the body frame 12. The knuckles 72a, 72b connect the upper arms 68a, 68b with the lower arms 70a, 70b, respectively. The shock absorbers 62a, 62b have their upper ends connected with the body frame 12. The shock absorbers 62a, 62b have their lower ends connected respectively with the upper arms 68a, 68b.

Figure 13:
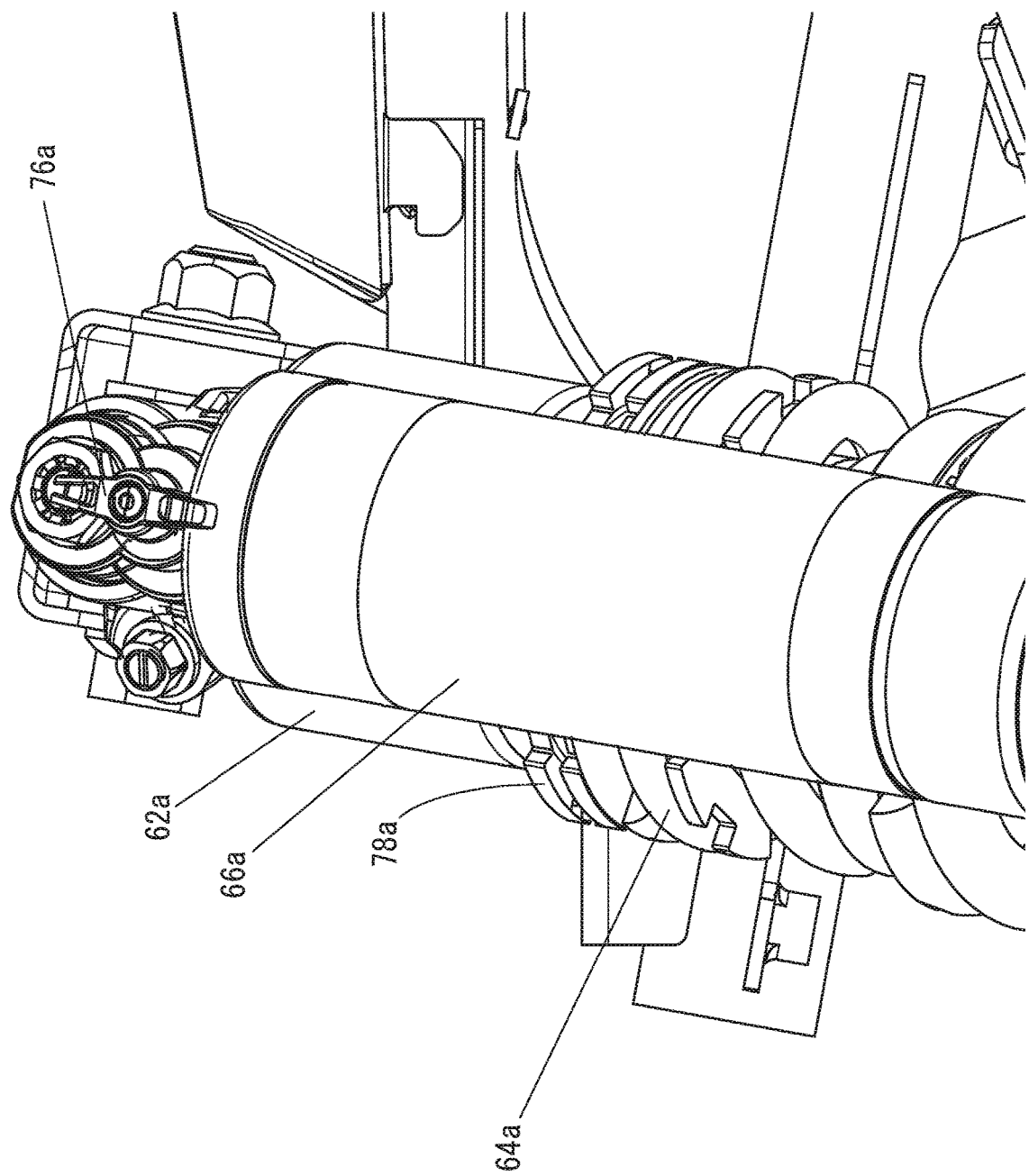
FIG. 13 is an enlarged side view which shows an area near a damping force adjusting portion and a load adjusting portion.
Figure 14:
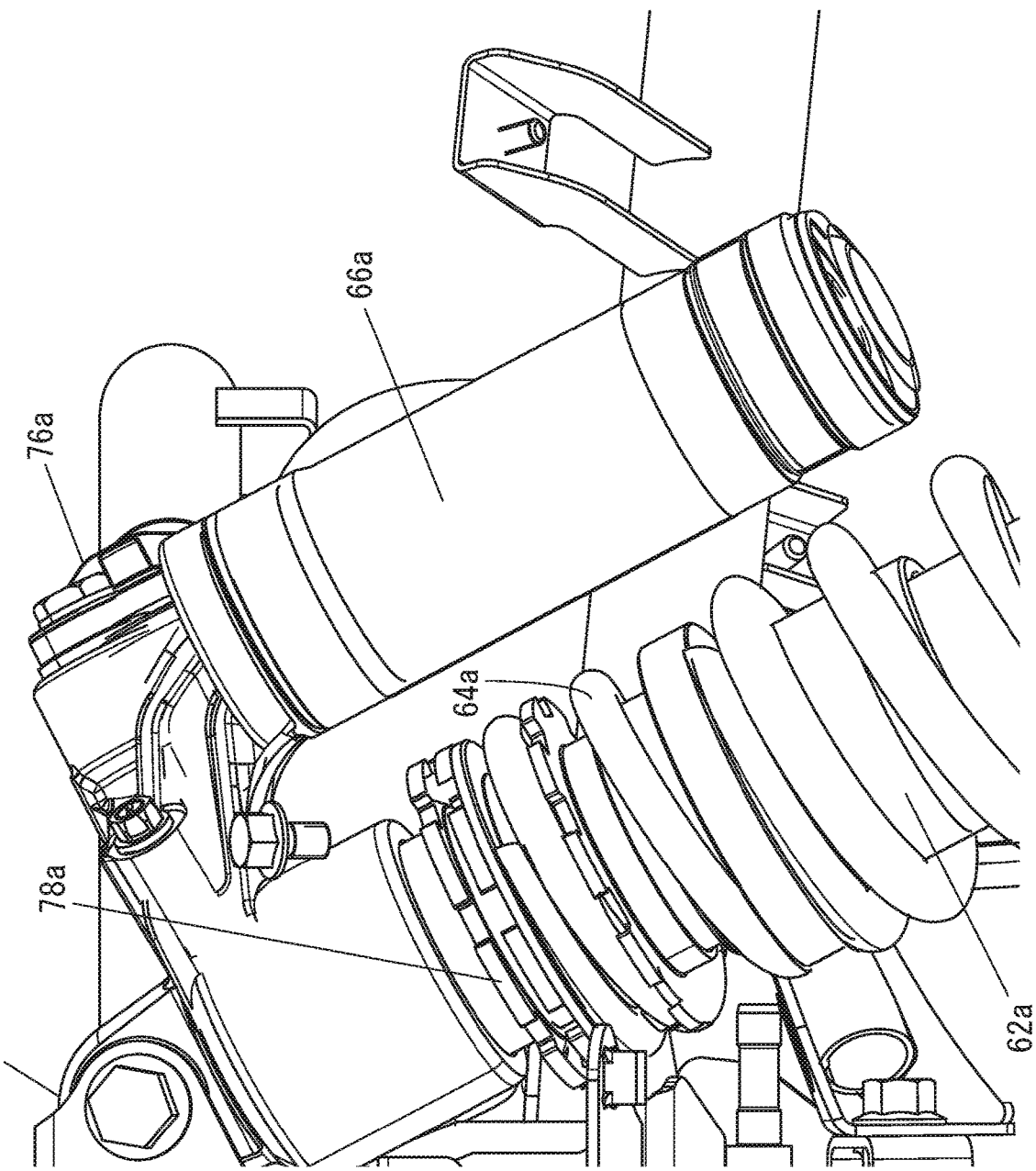
FIG. 14 is an enlarged front view which shows an area near the damping force adjusting portion and the load adjusting portion.

Further, the suspensions 58a, 58b respectively include suspension adjusting portions 74a, 74b located at upper portions thereof. The suspension adjusting portions 74a, 74b respectively include damping force adjusting portions 76a, 76b for damping force adjustment of the shock absorbers 62a, 62b; and load adjusting portions 78a, 78b for preload adjustment of the springs 64a, 64b. The damping force adjusting portions 76a, 76b are respectively located at a more outboard side in the vehicle's width direction than top ends (top ends T1, T2 of the suspensions 58a, 58b) of the shock absorbers 62a, 62b. Also, referring to FIG. 7, the damping force adjusting portions 76a, 76b are respectively inside a circle C with a radius from an upper end portion of the steering shaft 54 to an end of the grip 18a (18b), in a plan view. Referring to FIG. 13 and FIG. 14, in the present embodiment, the damping force adjusting portions 76a, 76b are provided by knobs located at outboard ends of respective connections between the shock absorbers 62a, 62b and the reservoir tanks 66a, 66b. By turning the knobs, i.e., the damping force adjusting portions 76a, 76b, it is possible to adjust the damping force. The load adjusting portions 78a, 78b are provided by double nuts for limiting top end positions of the respective springs 64a, 64b fitted around the shock absorbers 62a, 62b, and are attached at upper portions of the outer circumferences of the shock absorbers 62a, 62b. By adjusting mounting positions of the load adjusting portions 78a, 78b in a longitudinal direction of the shock absorbers 62a, 62b, it is possible to adjust the preload of the springs 64a, 64b.

Returning to FIG. 1 through FIG. 5, the vehicle 10 further includes a front fender 80 and a rear fender 82. The front fender 80 is provided above the pair of front wheels 14a, 14b, striding over the pair of front wheels 14a, 14b, in a plan view. In other words, the front fender 80 is continuous from above the front wheel 14a to above the front wheel 14b. Referring to FIG. 2, the front fender 80 is provided to cross a line segment L1 which connects a top end (i.e., a topmost point) of the front wheel 14a and the grip 18a, and to cross a line segment L2 which connects a top end (i.e., a topmost point) of the front wheel 14b and the grip 18b. The rear fender 82 is provided above the pair of rear wheels 16a, 16b, striding over the pair of rear wheels 16a, 16b, in a plan view. In other words, the rear fender 82 is continuous from above the rear wheel 16a to above the rear wheel 16b. The front fender 80 may be a one-piece member or a member made of a plurality of parts. The same applies to the rear fender 82.

Figure 7:
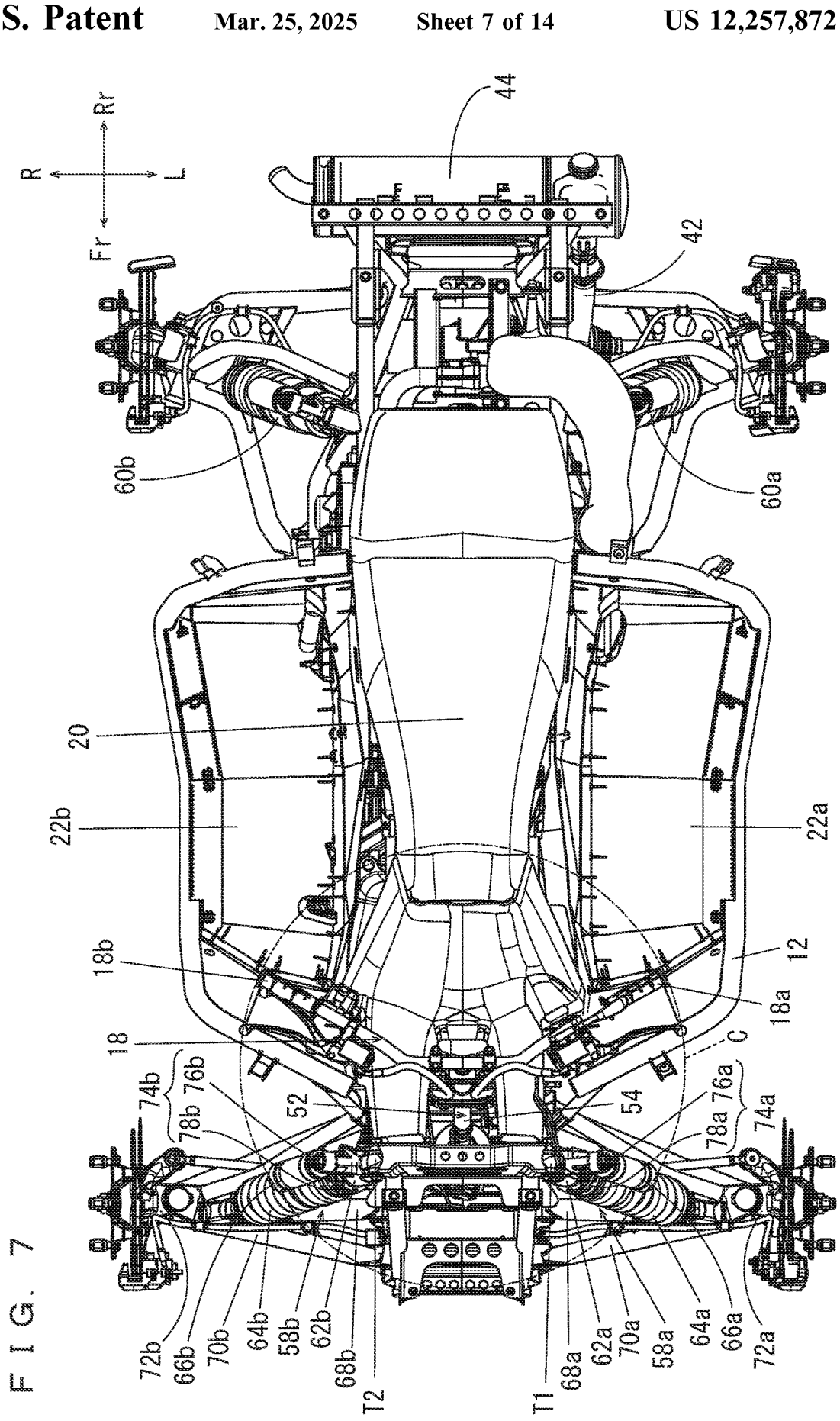
FIG. 7 is a plan view which shows a state where the wheels, the front fender, etc. are removed from the vehicle in FIG. 1.
Figure 8:
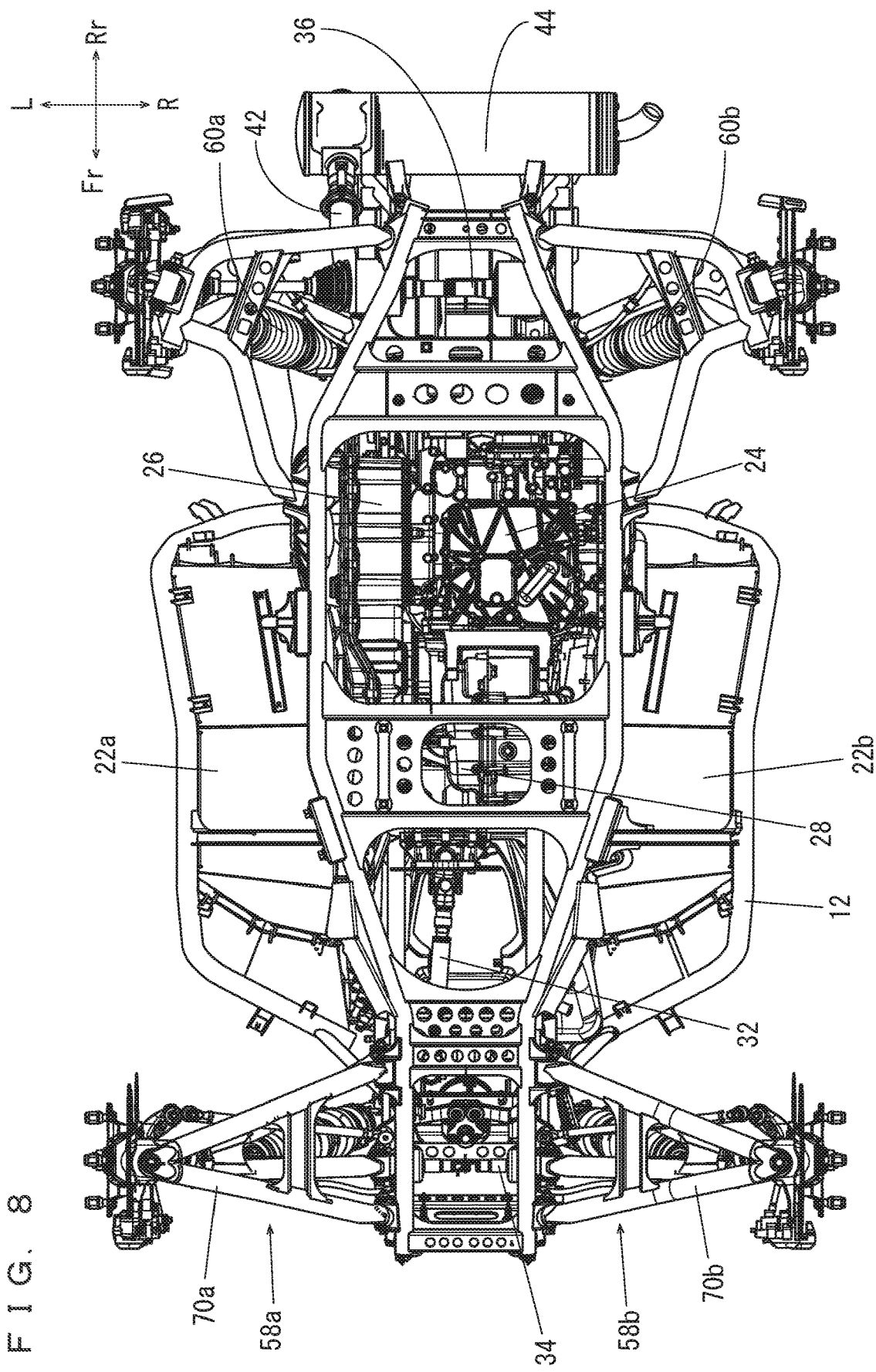
FIG. 8 is a bottom view which shows a state where the wheels, the front fender, etc. are removed from the vehicle in FIG. 1.

Referring to FIG. 2 and FIG. 7, the front fender 80 includes two, notch-like openings 80a, 80b for making it possible to access the suspension adjusting portions 74a, 74b and the shock absorbers 62a, 62b. In a plan view, the top ends T1, T2 of the suspensions 58a, 58b are exposed from the respective openings 80a, 80b.

Figure 4:
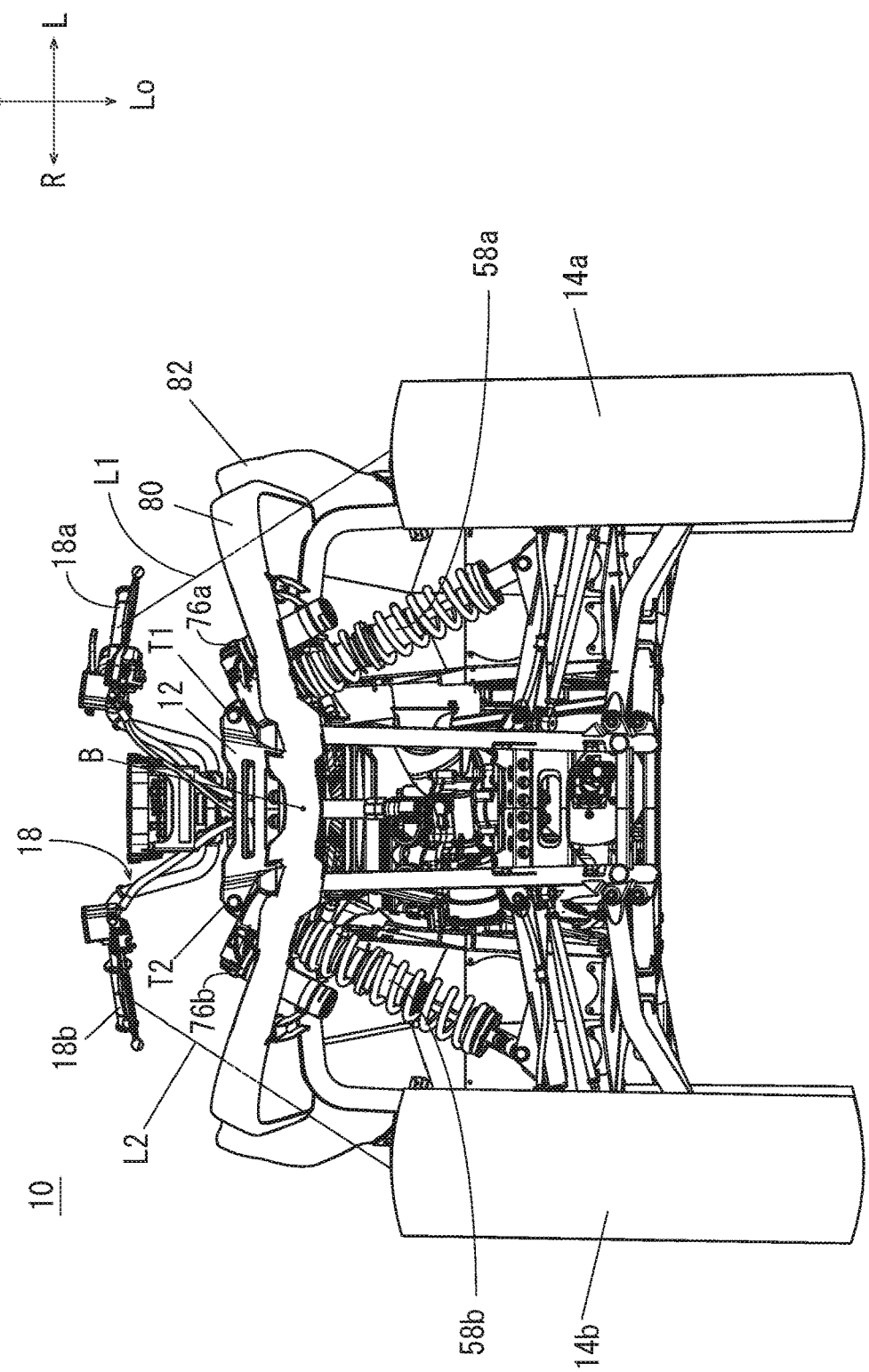
FIG. 4 is a front view which shows the vehicle in FIG. 1.
Figure 5:
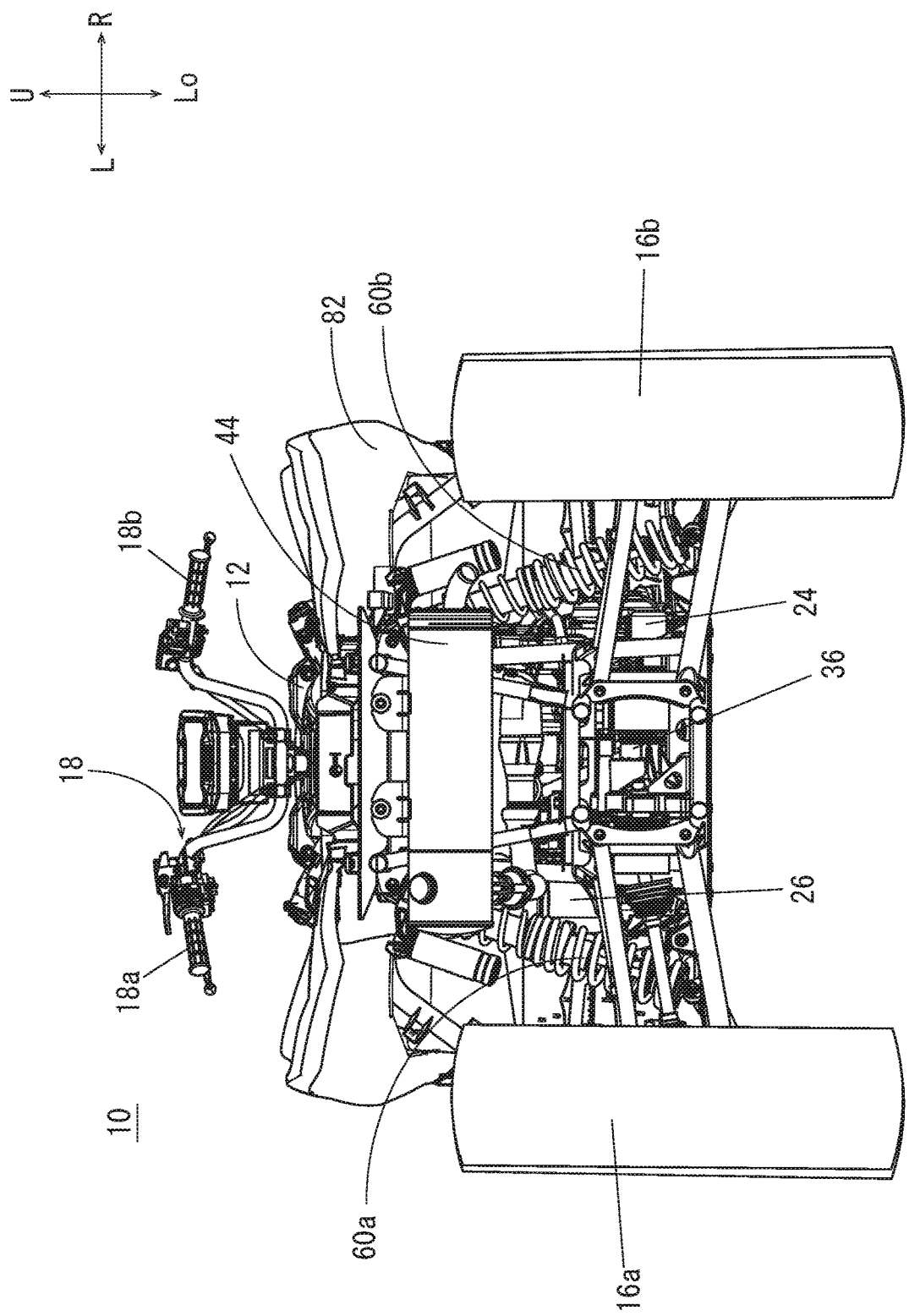
FIG. 5 is a rear view which shows the vehicle in FIG. 1.
Figure 6:
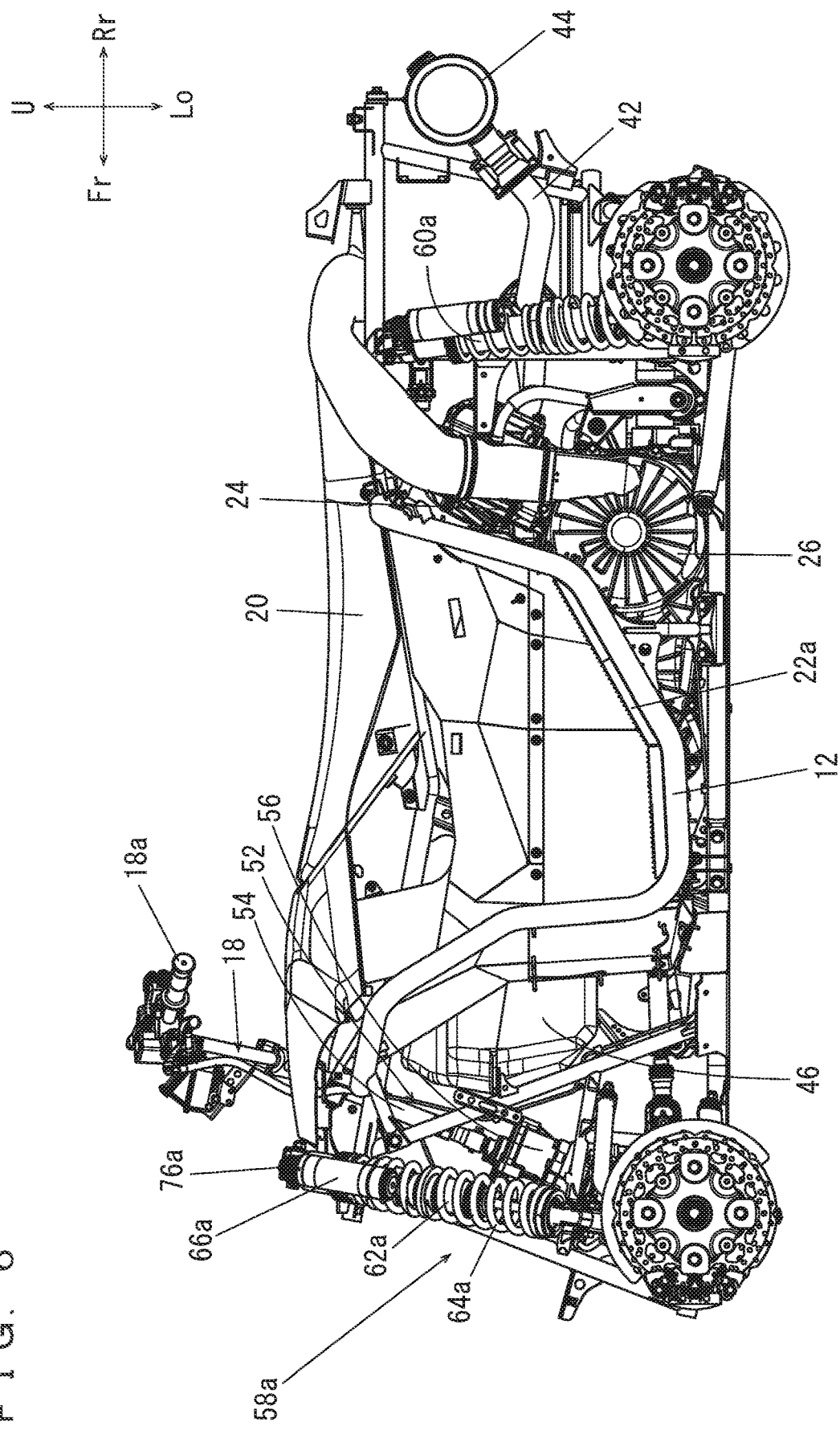
FIG. 6 is a side view which shows a state where wheels, a front fender, etc. are removed from the vehicle in FIG. 1.
Figure 9:
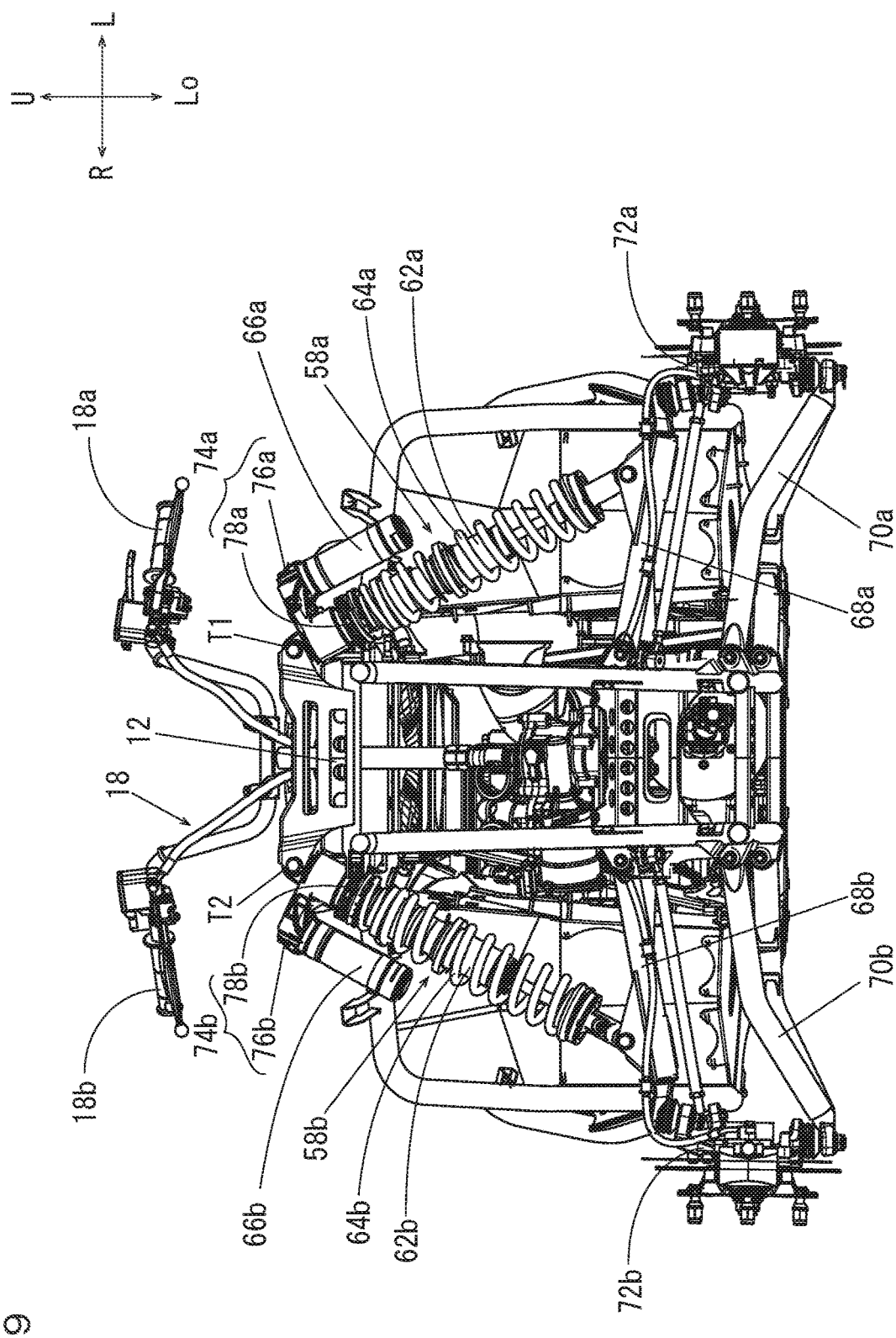
FIG. 9 is a front view which shows a state where the wheels, the front fender, etc. are removed from the vehicle in FIG. 1.
Figure 10:
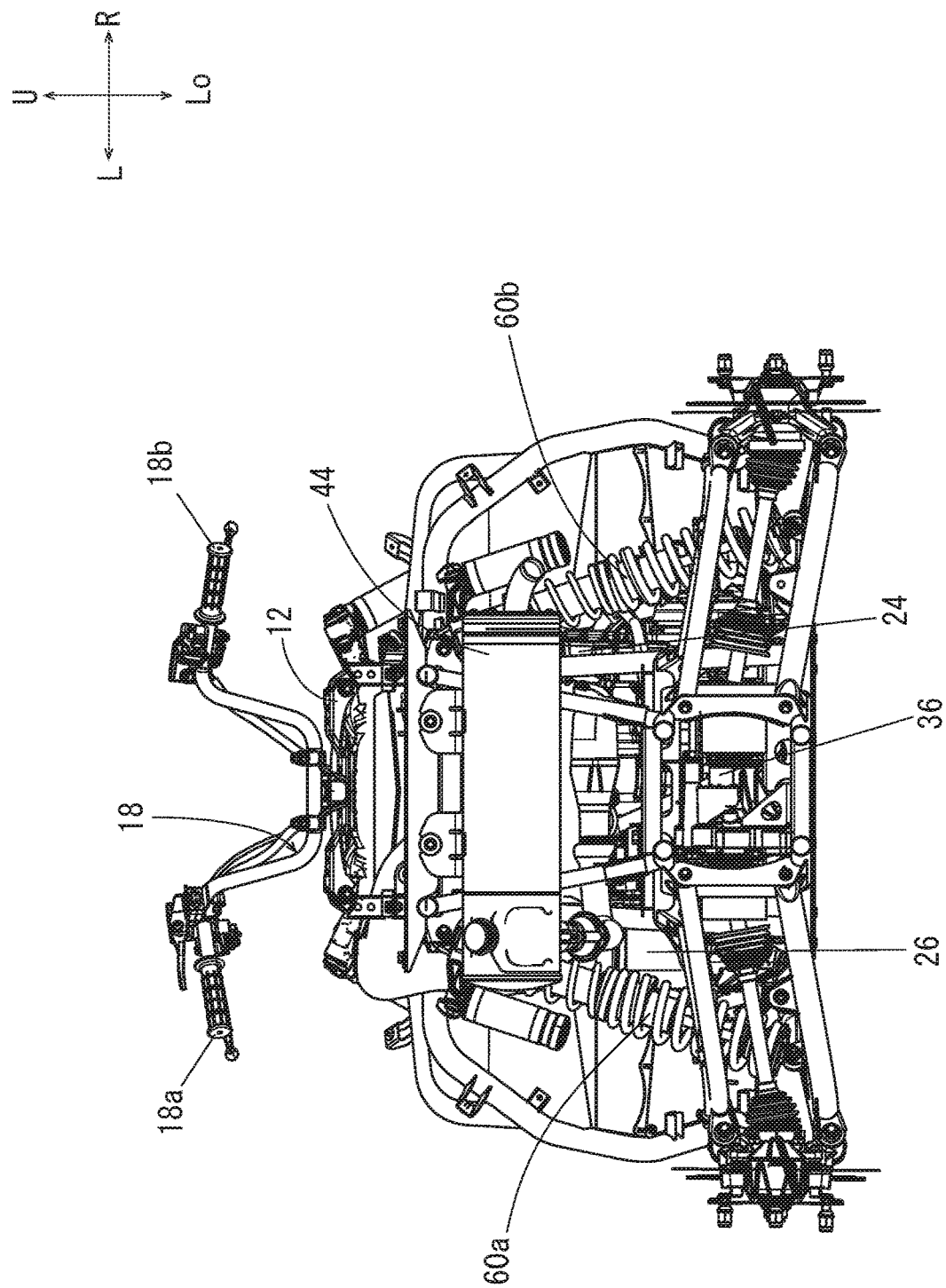
FIG. 10 is a rear view which shows a state where the wheels, the front fender, etc. are removed from the vehicle in FIG. 1.

Referring also to FIG. 4 and FIG. 9, the top ends T1, T2 of the suspensions 58a, 58b are above the respective openings 80a, 80b. In other words, the tops of the shock absorbers 62a, 62b are above the respective openings 80a, 80b. Also, the damping force adjusting portions 76a, 76b are above the respective openings 80a, 80b. In a front view, the top ends T1, T2 of the suspensions 58a, 58b are at higher positions than a front end (i.e., a frontmost point) B of the front fender 80. In other words, in a front view, the top ends of the shock absorbers 62a, 62b are at higher positions than the front end B of the front fender 80.

According to the vehicle 10 described thus far, the suspension adjusting portions 74a, 74b are near the grips 18a, 18b, and it is possible to make direct access to the suspension adjusting portions 74a, 74b from the openings 80a, 80b of the front fender 80. Therefore, it is possible, without requiring any new electronic devices, to operate the suspension adjusting portions 74a, 74b to adjust the suspensions 58a, 58b easily.

Since the suspensions 58a, 58b have their top ends T1, T2 located more rearward than the centers of the front wheels 14a, 14b, it is also possible to access the suspension adjusting portions 74a, 74b from near the bar handle 18.

Since the front fender 80 is provided to cross the line segment L1 which connects the top end of the front wheel 14a and the grip 18a, and to cross the line segment L2 which connects the top end of the front wheel 14b and the grip 18b, it is easy to form the openings 80a, 80b in the front fender 80 which make it possible to access the suspension adjusting portions 74a, 74b.

Since the top ends T1, T2 of the suspensions 58a, 58b are exposed from the openings 80a, 80b in a plan view, it is easy to access the suspension adjusting portions 74a, 74b which are located at the upper portions of the suspensions 58a, 58b.

Since the top ends T1, T2 of the suspensions 58a, 58b are at higher positions than the front end B of the front fender 80 in a front view, it is easy to access the suspension adjusting portions 74a, 74b which are located at the upper portions of the suspensions 58a, 58b. Also, the invention makes it possible to utilize long suspensions 58a, 58b extending upward beyond the front fender 80, making it possible to increase wheel travel.

Since the top ends T1, T2 of the suspensions 58a, 58b are above the openings 80a, 80b, it is easy to access the suspension adjusting portions 74a, 74b which are located at the upper portions of the suspensions 58a, 58b. Also, the invention makes it possible to utilize long suspensions 58a, 58b extending upward beyond the front fender 80, making it possible to increase wheel travel.

It is easy, with the damping force adjusting portions 76a, 76b, to adjust the damping force of the shock absorbers 62a, 62b.

The lower ends of the shock absorbers 62a, 62b are connected with the upper arms 68a, 68b. This ensures sufficient suspension stroke without any need for a structure to avoid interference with the upper arms 68a, 68b, for example. The invention improves freedom in designing the shock absorbers 62a, 62b.

Since the damping force adjusting portions 76a, 76b are more outboard in the vehicle's width direction than the top ends of the shock absorbers 62a, 62b, it is possible to smoothly access the damping force adjusting portions 76a, 76b without being obstructed by the shock absorbers 62a, 62b.

The damping force adjusting portions 76a, 76b are respectively inside a circle C with a radius from an upper end portion of the steering shaft 54 to an end of the grip 18a (18b), in a plan view. This makes it possible to dispose the damping force adjusting portions 76a, 76b near the bar handle 18, which makes it easy to access the damping force adjusting portions 76a, 76b.

It is easy, with the load adjusting portions 78a, 78b, to make preload adjustment of the springs 64a, 64b.

Also, according to the vehicle 10, it is possible to remove the shock absorbers 62a, 62b through the openings 80a, 80b without removing the front fender 80.

It should be noted here that in the embodiment described above, the openings 80a, 80b of the front fender 80 are formed like notches. However, the invention is not limited to this. The openings may be provided by through-holes formed in the front fender.

Also, the openings 80a, 80b of the front fender 80 may be provided with openable/closable covers.

The present invention being thus far described in terms of preferred embodiments, it is obvious that these may be varied in many ways within the scope and the spirit of the present invention. The scope of the present invention is limited only by the accompanied claims.

The invention claimed is:

1. A vehicle comprising:
    a pair of front wheels;
    a pair of rear wheels;
    a saddle-style seat, positioned at an intermediate region in a width direction of the vehicle;
    a steering shaft provided ahead of the seat;
    a bar handle connected with an upper portion of the steering shaft, the bar handle having a pair of grips;
    a front fender provided above the pair of front wheels, striding over the pair of front wheels in a plan view of the vehicle; and
    a pair of suspensions, top ends of which are respectively located ahead of the pair of grips, and are positioned, in the plan view of the vehicle, respectively more inboard than widthwise ends of the pair of grips in the width direction of the vehicle, wherein
    each of the pair of suspensions includes, at an upper portion thereof, a suspension adjusting portion, and
    the front fender includes a pair of openings through which the suspension adjusting portions are respectively accessible, wherein
    the top ends of the pair of suspensions are located above the pair of openings, respectively.

2. The vehicle according to claim 1, wherein the top ends of the pair of suspensions are located more rearward than centers of the pair of front wheels, respectively.

3. The vehicle according to claim 1, wherein the front fender is so positioned as to cross a pair of line segments, which connect topmost points of the pair of front wheels and the pair of grips, respectively.

4. The vehicle according to claim 1, wherein the top ends of the pair of suspensions are exposed from the pair of openings in the plan view of the vehicle, respectively.

5. The vehicle according to claim 1, wherein the top ends of the pair of suspensions are each located at a higher position than a frontmost point of the front fender in a front view of the vehicle.

6. The vehicle according to claim 1, wherein
    each of the pair of suspensions further includes a shock absorber, and
    the suspension adjusting portion of said each suspension includes a damping force adjusting portion for adjusting a damping force of the shock absorber.

7. The vehicle according to claim 6, wherein said each suspension further includes an upper arm, which is connected with a lower end of the shock absorber.

8. The vehicle according to claim 6, wherein in the width direction of the vehicle, the damping force adjusting portion is located more outboard than a top end of the shock absorber.

9. The vehicle according to claim 6, wherein in the plan view of the vehicle, a distance between the damping force adjusting portion and an uppermost end of the steering shaft is no larger than a distance between the widthwise end of each of the pair of grips and the uppermost end of the steering shaft.

10. The vehicle according to claim 1, wherein
    each of the pair of suspensions further includes a spring, and the suspension adjusting portion of said each suspension includes a load adjusting portion for adjusting a preload of the spring.

11. A vehicle comprising:
a pair of front wheels;
a pair of rear wheels;
a saddle-style seat, positioned at an intermediate region in a width direction of the vehicle;
a steering shaft provided ahead of the seat;
a bar handle connected with an upper portion of the steering shaft, the bar handle having a grip;
a front fender provided above the pair of front wheels, striding over the pair of front wheels in a plan view of the vehicle; and
a suspension, a top end of which is located ahead of the grip, and is positioned, in the plan view of the vehicle, more inboard than a widthwise end of the grip in the width direction of the vehicle, wherein
the suspension includes
   a shock absorber, a top end thereof being located at a higher position than a frontmost point of the front fender in a front view of the vehicle, and
   an upper arm connected to a lower end of the shock absorber;
the front fender includes an opening through which the shock absorber is accessible; and
the top end of the shock absorber is located above the opening.

* * * * *